United States Patent [19]
Wojtkowski, Jr. et al.

[11] Patent Number: 6,149,309
[45] Date of Patent: Nov. 21, 2000

[54] BUSHING FOR OIL FILM BEARING

[75] Inventors: Thomas C. Wojtkowski, Jr., Shrewsbury; Timothy S. Dolan, Westminster, both of Mass.

[73] Assignee: Morgan Construction Company, Worcester, Mass.

[21] Appl. No.: 09/351,797

[22] Filed: Jul. 13, 1999

[51] Int. Cl.⁷ .............................. F16C 33/02; F16C 13/00
[52] U.S. Cl. ........................ 384/276; 384/296; 384/419
[58] Field of Search .................................. 384/276, 295, 384/296, 416, 418, 419

[56] References Cited

U.S. PATENT DOCUMENTS

| | | | |
|---|---|---|---|
| 2,018,055 | 10/1935 | Dahlstrom | 384/419 |
| 3,782,796 | 1/1974 | Rickley et al. | 384/584 |
| 4,286,830 | 9/1981 | Salter, Jr. | 384/584 |
| 4,351,576 | 9/1982 | Nishide et al. | 384/276 |
| 4,917,509 | 4/1990 | Takano | 384/275 |
| 5,836,698 | 11/1998 | Richardson | 384/295 |

*Primary Examiner*—Thomas R. Hannon
*Attorney, Agent, or Firm*—Samuels, Gauthier & Stevens

[57] ABSTRACT

An oil film bearing for a roll neck in a rolling mill, comprising a bearing chock containing a bushing having a lining of babbitt metal. A sleeve is removably received on and rotationally fixed relative to the roll neck. The sleeve is journalled for rotation within and is axially shiftable with respect to the bushing. An abutment protrudes radially from an exposed outboard end of the sleeve for engagement by an outboard end face of the bushing during axial removal of the bearing from the roll neck. The lining of babbitt metal is recessed axially inwardly from the bushing outboard end face by a distance sufficient to prevent it from being damaged by engagement with the radially protruding abutment.

5 Claims, 3 Drawing Sheets

BUSHING FOR OIL FILM BEARING

FIELD OF THE INVENTION

This invention relates generally to oil film bearings of the type employed to rotatably support the necks of rolls in a rolling mill, and is concerned in particular with an improvement in the bushings employed in such bearings.

BACKGROUND OF THE INVENTION

In a conventional oil film bearing of the type shown in FIG. 1, a sleeve 10 is axially received on the tapered section 12 of a roll neck protruding axially from the roll body 16. The sleeve has a tapered interior surface 18 axially received on the tapered roll neck section 12, and a cylindrical outer surface 20 journalled for rotation in a bushing 22 contained in and fixed relative to a chock 24. The bushing has an internal lining 23 of babbitt metal. One end of the sleeve is provided with a radially outwardly protruding circular flange 26, as well as with a radially inwardly protruding circular collar 28. Keyways 30 are machined into the collar 28. Keys 32 are received in notches 34 in a reduced diameter cylindrical extension 36 of the roll neck. The keys 32 protrude into the keyways 30 in the inner sleeve collar 28 to fix the sleeve 10 against rotation relative to the tapered roll neck section 12.

Other conventional bearing components include an inboard seal assembly 38, sleeve retaining ring 40, roller thrust bearing 42 and associated retaining and outboard sealing elements generally depicted at 44.

The chock 24, bushing 22, sleeve 10 and the other above described conventional components are axially receivable on and removable from the roll neck as a single unit or assembly. During axial removal, the chock 24 is pulled in the direction of arrow 46. The bushing 22 follows the chock, and by virtue of the interengagement of the outboard end face 22a of the bushing with the sleeve flange 26, the sleeve is axially dislodged from the tapered section 12 of the roll neck.

In a recent development directed to reducing the size of the forgoing from which the sleeve 10 is machined, the sleeve flange 26 has been eliminated and replaced by an improved keying arrangement. An oil film bearing incorporating one embodiment the redesigned sleeve and keying arrangement is shown in FIGS. 2 and 3, where like reference numerals have been employed to identify conventional components described earlier with reference to FIG. 1. The redesigned sleeve 50 is again provided with a tapered interior surface 52 seated on the tapered section 12 of the roll neck, and a cylindrical outer surface 54 journalled for rotation in the bushing 22 contained within the chock 24.

Key assemblies generally indicated at 56 are employed to rotatably fix the sleeve 50 to the roll neck. Each key has a generally T-shaped configuration, with a radial segment 56a having a protruding outer portion 56b defining an abutment engageable by the bushing end face 22a during axial removal of the bearing from the roll neck. The radial segment 56a extends through a stepped bore in the sleeve 50 and is connected to a base segment 56c by means of a bolt 58 or other like fastener. The base segment 56c is received in a groove 60 cut into the cylindrical neck section 36 adjacent to the tapered section 12 of the roll neck. The radially protruding outer portions 56b of the keys 56 take the place of the conventional circular sleeve flange 26, thereby making it possible to reduce both the size of the forging from which the sleeve is machined, and the costs of machining the sleeve.

As can best be seen in FIG. 3, the contact areas between the radially protruding abutment portions 56b of the new keying arrangements 56 and the end face 22a of the bushing are relatively small, indeed comprising only a fraction of the entire circumference of the end face 22a. Thus, during removal of the bearing from the roll neck, a concern has arisen that the resulting concentrated unit loading on the bushing end face may cause distress in the lining 23 of babbitt metal.

The objective of the present invention is to safeguard the lining of babbitt metal from such distress during removal of the bearing assembly from the roll neck.

DETAILED DESCRIPTION OF PREFERRED EMBODIMENT

Figure 1:
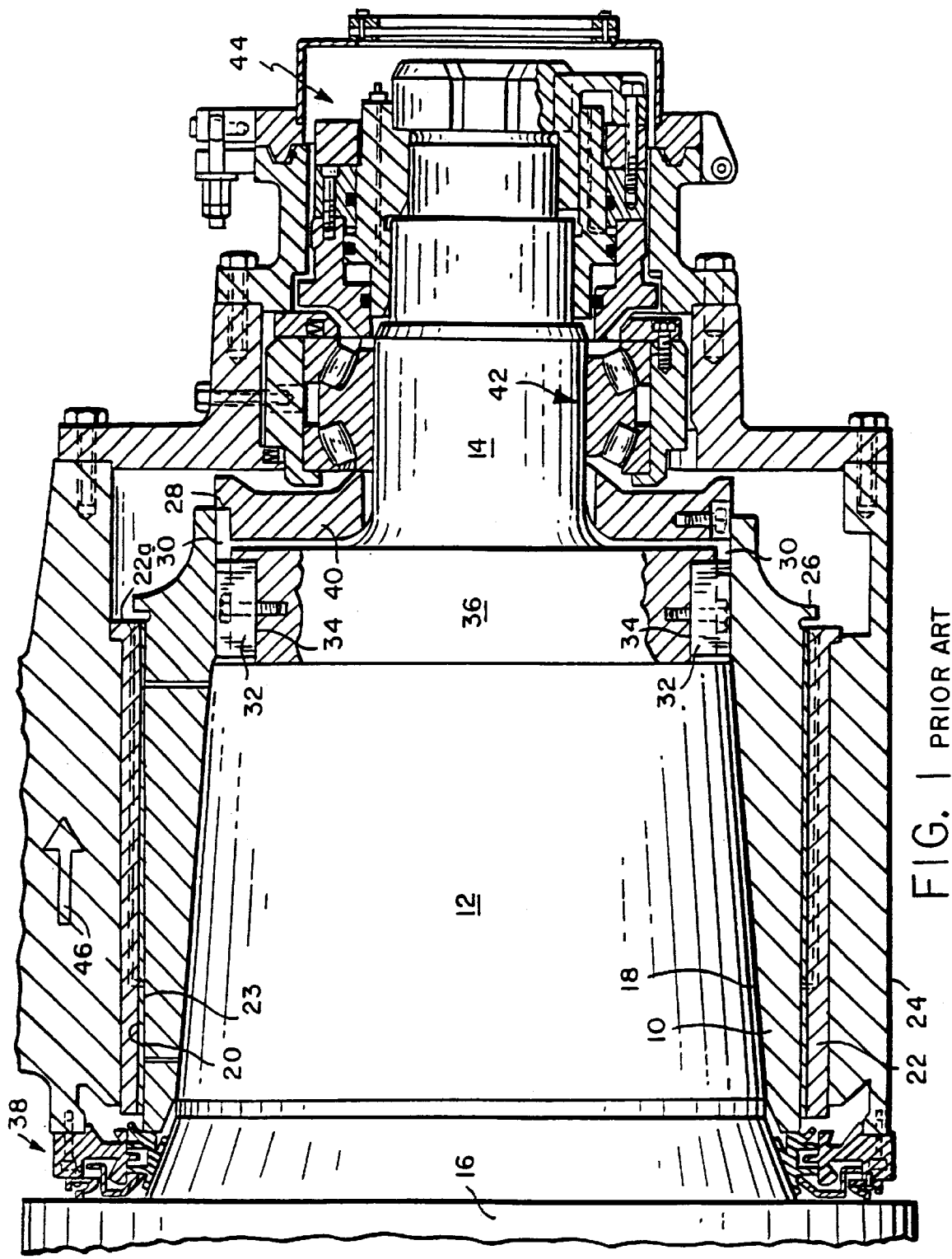
FIG. 1 is a longitudinal sectional view of a rolling mill oil film bearing incorporating a conventional sleeve and keying arrangement.
Figure 2:
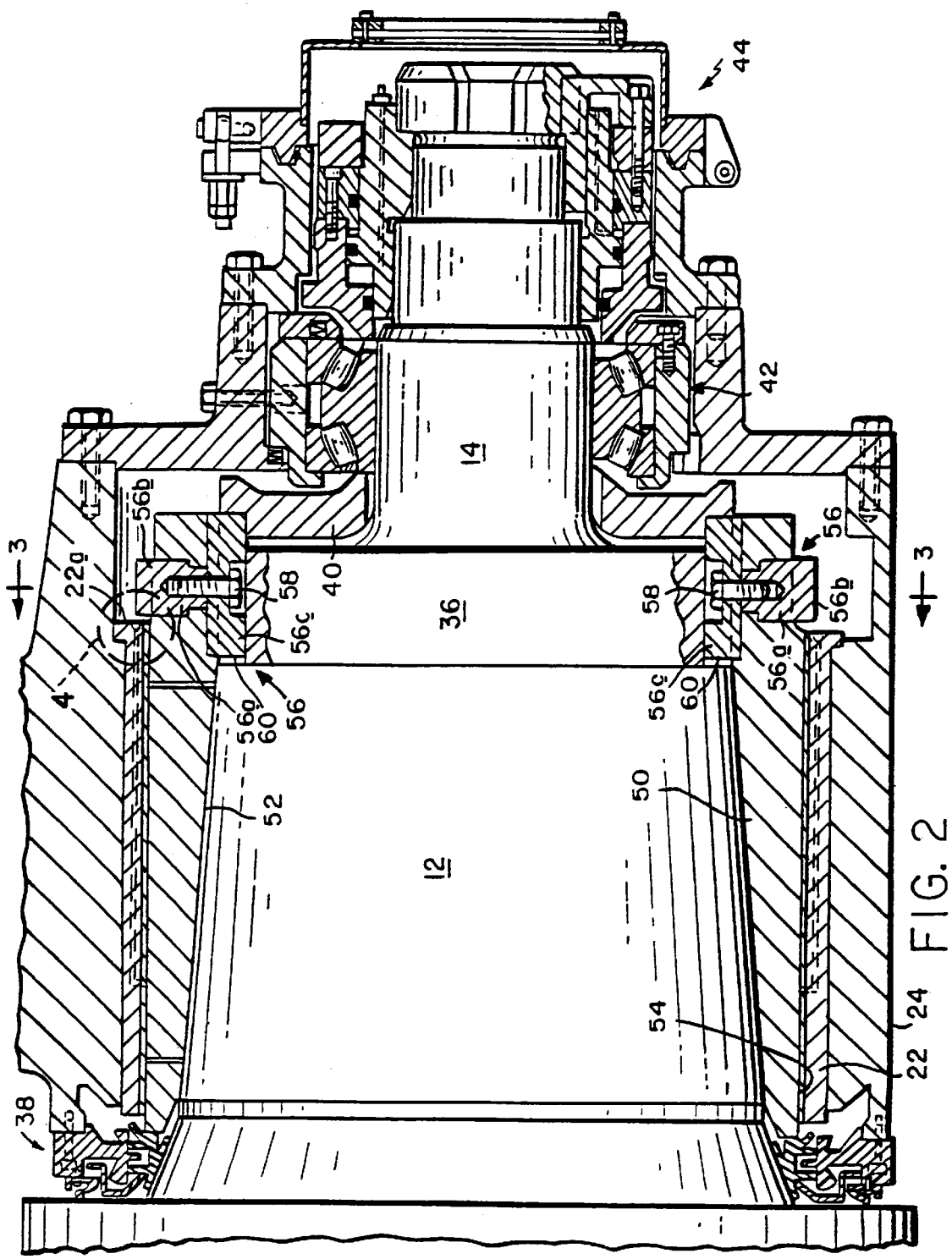
FIG. 2 is a longitudinal sectional view similar to FIG. 1 illustrating a recent development incorporating a redesigned sleeve and keying arrangement.
Figure 3:
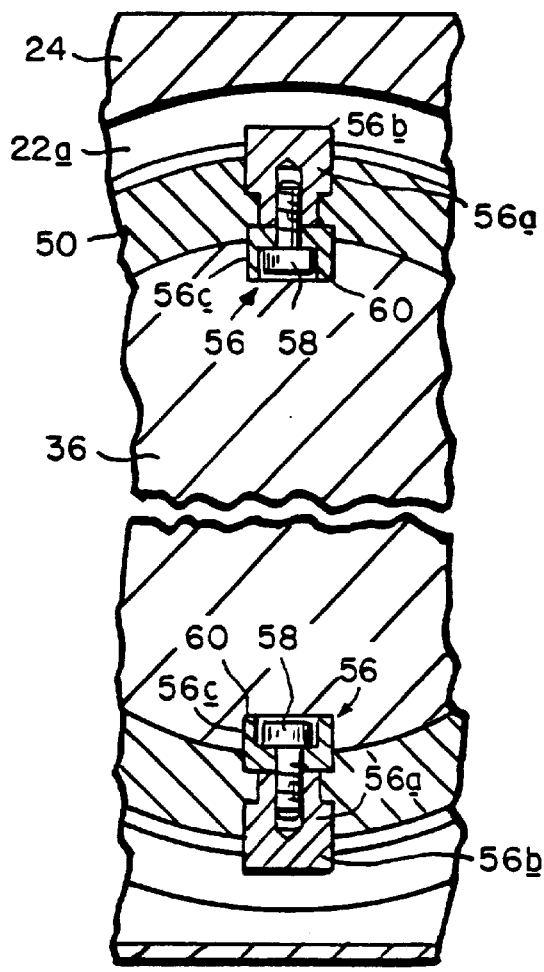
FIG. 3 is a sectional view taken along line 3—3 of FIG. 2.
Figure 4:
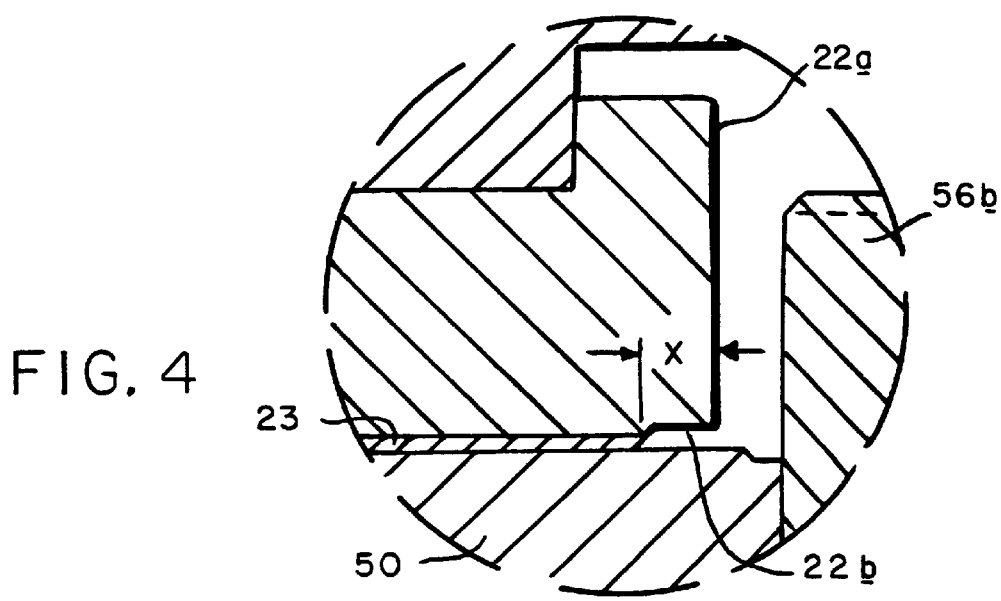
FIG. 4 is an enlarged view of the circled area of FIG. 2.

With reference to FIG. 4, it will be seen that the lining 23 of babbitt metal has been recessed axially inwardly from the bushing end face 22a by a distance "X". The distance "X" is sufficient to prevent the lining from being damaged or distressed by engagement of the bushing end face 22a with the abutment 56b, and is at least 10% and preferably about 15% of the circumferential distance "Y" contacted by the abutment portion 56b of each key assembly 56. The lining of babbitt metal 23 typically has a thickness of between about 0.125 to 9.53 mm, preferably between about 0.750 to 3.25 mm, and the distance "X" is greater than the minimum lining thickness of the aforesaid ranges.

The lining recess may be achieved either by masking the area 22b to prevent coverage during application of the babbitt metal, or by subsequently machining babbitt metal from area 22b.

We claim:

1. An oil film bearing for a roll neck in a rolling mill, said bearing comprising:

a bearing chock;

a bushing contained by said bearing chock, said bushing having a lining of babbitt metal;

a sleeve adapted to be removably received axially on and rotationally fixed relative to the roll neck, said sleeve being journalled for rotation within and being axially shiftable with respect to said bushing, said sleeve having an end section protruding axially beyond an end face of said bushing; and an abutment protruding radially from the end section of said sleeve for engagement by a circumferential segment of the end face of said bushing during axial removal of said bearing from said roll neck, said lining of babbitt metal being recessed axially inwardly from the end face of said bushing by a distance sufficient to prevent said lining from being damaged by the engagement of the bushing end face with said abutment.

2. The oil film bearing of claim 1 wherein said lining of babbitt metal has a thickness of between about 0.125 to 9.23 mm, and is recessed axially inwardly from the end face of said bushing by a distance greater than the minimum of said thickness range.

3. The oil film bearing of claim 1 wherein said lining of babbitt metal has a thickness of between about 0.750 to 3.25 mm, and is recessed inwardly from the end face of said bushing by a distance greater than the minimum of said thickness range.

4. The oil film bearing of claim 1 wherein said distance is at least 10% of said circumferential segment.

5. The oil film bearing of claim 1 wherein said distance is about 15% of said circumferential segment.

* * * * *